Nov. 2, 1954 J. E. COPE ET AL 2,693,531

APPARATUS FOR GENERATING TELEVISION AND LIKE WAVE FORMS

Filed Sept. 6, 1949

Inventor
John Edward Cope & Ernest Oliver Holland
By Bain & Beaak
Attorney

United States Patent Office 2,693,531

Patented Nov. 2, 1954

2,693,531

APPARATUS FOR GENERATING TELEVISION AND LIKE WAVEFORMS

John Edward Cope and Ernest Oliver Holland, Cambridge, England, assignors to Pye Limited, Cambridge, England, a British company Application September 6, 1949, Serial No. 114,144

Claims priority, application Great Britain September 6, 1948

8 Claims. (Cl. 250—27)

The present invention relates to apparatus for generating waveforms comprising line and frame synchronizing pulses as used in television transmitting systems.

According to the present invention, the waveform generator comprises a line pulse generator and a frame pulse generator, the frame pulse generator being controlled by a gate pulse derived through a divider network from the line pulses, the time interval between the pulses fed to the line pulse generator and the divider network being adjusted to compensate for the delay in the divider network so that the gate pulse will occur at an instant between, and preferably substantially midway between, two line pulses whereby the triggering of the frame pulse generator by the line pulse next succeeding the gate pulse may be positively ensured.

The present invention also consists in a waveform generator comprising a master pulse generator, a line pulse generator and a frame pulse generator, the line and frame pulse generators being controlled by pulses from the master pulse generator, the admission of pulses from the master pulse generator to the frame pulse generator being controlled by a gate controlled through a divider network from the master generator and means being provided for compensating for the delay in the divider network to enable the instant of opening of the gate to be adjusted. By such adjustment, it can be ensured that the frame pulse generator is controlled by the pulse from the master pulse generator which next succeeds the opening of the gate.

Advantageously, the apparatus includes a waveform shaping circuit comprising two electronic valves direct current coupled in cascade and having means for applying an adjustable bias to the control grid of the first valve in addition to a substantially sine wave input waveform and having an output circuit connected to the anode of the second valve for obtaining a squared wave, the duration of the peaks of which is adjustable by adjusting the bias supplied to the first valve.

The present invention also comprises apparatus for generating a waveform comprising line and frame synchronizing pulses, particularly for television transmitting systems, wherein two trains of pulses of the same frequency are produced from a master oscillator, one of said trains of pulses being used for triggering the line pulse generator and also being fed to trigger the frame pulse generator through a gating device which is periodically opened at frame frequency by the output from a divider to which the second train of pulses is fed, and wherein means are provided for varying the time relationship between the pulses of the two trains to compensate for delay in the divider to enable the instant of opening of the gate to be adjusted to ensure the triggering of the frame pulse generator by the next succeeding pulse of the first-mentioned train.

In order that this invention may be more fully understood, one embodiment thereof will be described by way of example with reference to the accompanying drawings, in which.

Figure 1:
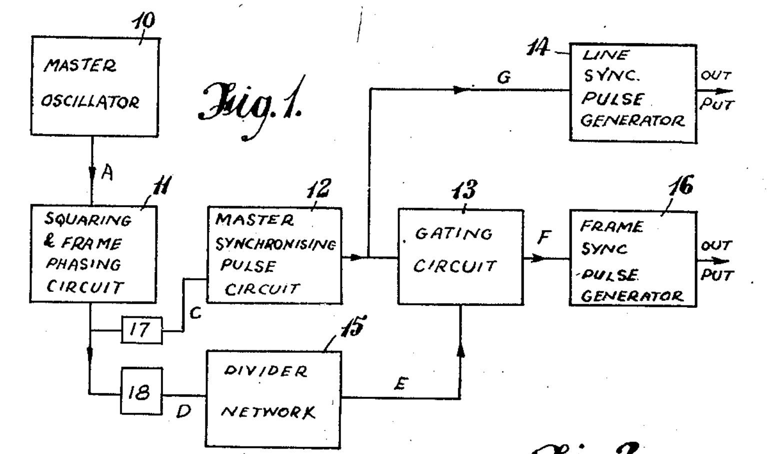
Fig. 1 is a block diagram of the apparatus.
Figure 2:
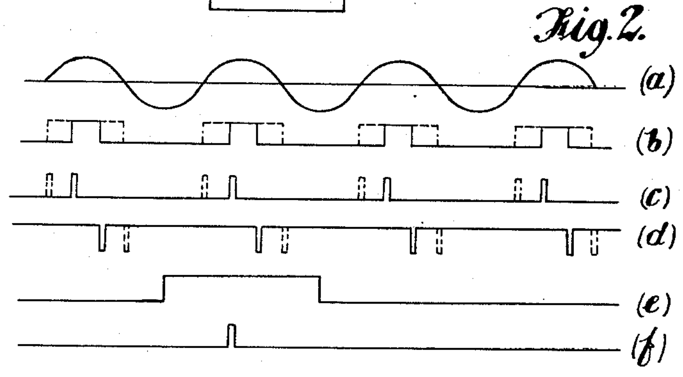
Fig. 2 is a composite diagram showing the waveform at various parts of the apparatus.

Referring to Figs. 1 and 2, the apparatus comprises a master oscillator 10, the output of which is fed through a connection A to a squaring and frame phasing circuit 11 from which pulses are fed through a differentiating circuit 17 and a connection C to a master synchronizing pulse circuit 12 which feeds a gating circuit 13 and also the line synchronizing pulse generator 14 through a connection G. Output from the squaring and frame phasing circuit 11 is also taken through another differentiating circuit 18 and a connection D to a divider network 15, which controls the gating circuit 13 through a connection E. Output from the gating circuit 13 is taken through a connection F to the frame synchronizing pulse generator 16.

The master oscillator 10 generates a waveform which is substantially a sine wave, as shown in Fig. 2*a*, and this waveform is fed to the squaring and frame phasing circuit through the connection A. The squaring and frame phasing circuit 11 is arranged to convert the sine wave fed from the master oscillator 10 into a squared wave, as shown in Fig. 2*b*, the width of the pulses of which can be adjusted so that the phasing (time relationship) between the leading and trailing edges of the squared waveform can be altered. A suitable circuit for obtaining such an adjustable width squared waveform is hereafter described with reference to Fig. 3.

The squared waveform obtained in the squaring and frame phasing circuit 11 is applied to differentiating circuits 17 and 18 resulting in trains of relatively short pulses of opposite sign corresponding to the leading and trailing edges of the squared waveform. The master synchronising pulse circuit 12 is made responsive to pulses of one sign fed through the connection C from the differentiating circuit 17, while the divider network 15 is made responsive to pulses of the opposite sign fed through the connection D from the differentiating circuit 18. Figs. 2*b*, *c* and *d* show the squared waveform and the pulses in the connections C and D, respectively. The full lines show the pulses when the squared wave in Fig. 2*b* is relatively narrow while the dotted lines show the pulses when the squared wave is wider. It will be noted that as the width of the squared waveform at Fig. 2*b* is widened, the pulses at C corresponding to the leading edges of the squared waveform are advanced and, at the same time, the pulses at D corresponding to the trailing edge of the squared waveform are retarded so that the phase difference between the pulses at C and D can be varied by varying the width of the squared waveform pulses. The two trains of pulses are of the same frequency but the phasing or time relationship between them is adjustable. This phase adjustment between the pulses at C and D is utilised, according to a feature of this invention, to compensate for the delay which is inherent in the divider network 15. The apparatus is so adjusted that the gating circuit 13 is opened approximately midway between successive pulses so that the next succeeding pulse from the master synchronising pulse circuit 12 will pass through the gating circuit 13 to the framing synchronising pulse generator 16. Thereafter, the gating circiut 13 will close until the divider network 15 has counted an appropriate number of pulses after which it will again open. Fig. 2*e* shows the period during which a pulse for opening the gating circuit is applied through the connection E. Fig. 2*f* shows the gated pulse which is permitted to pass through the gating circuit 13 to the connection F and thence to the frame synchronising pulse generator 16. Pulses are also fed from the master synchronising pulse circuit 12 through the connection G to the line synchronising pulse generator 14. The outputs from the line synchronising pulse generator 14 and the frame synchronising pulse generator 16 may be combined to form the composite line and frame synchronising pulses for use in the television transmitting system.

Figure 3:
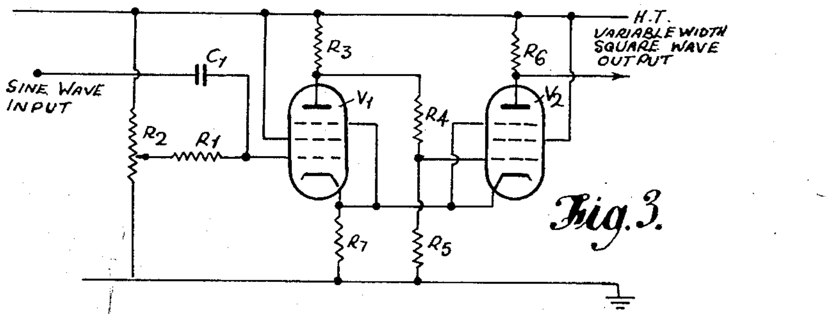
Fig. 3 is a circuit diagram of a preferred form of circuit for obtaining variable width squared waveform pulses.

The circuit arrangement shown in Fig. 3 illustrates, by way of example, one form of circuit which may be used to shape the waveform to convert a substantially sine wave input from the master oscillator 10 into a variable width squared waveform output as shown in Fig. 2*b*, from which the pulses shown in Figs. 2*c* and 2*d* can be derived. The circuit comprises two electronic valves $V_1$ and $V_2$ connected in cascade. The control grid of the first valve $V_1$ has a sine waveform input from the master oscillator 10 applied to it through a condenser $C_1$. The control grid is also connected through a resistance $R_1$ to the slider of a potentiometer $R_2$ connected between high tension positive and high tension negative so that an adjustable bias can be applied to the control grid of the valve $V_1$. The anode of the valve $V_1$ is connected through an anode resistance $R_3$ to the high tension positive supply and through a resistance $R_4$ to the control grid of the second valve $V_2$. The control grid of the second valve $V_2$ is connected to earth through a grid resistance $R_5$. The anode of the valve $V_2$ is connected through the resistance $R_6$ to a high tension positive supply. A common cathode resistance $R_7$ is used for the two valves $V_1$ and $V_2$. In the circuit arrangement shown, the valves $V_1$ aid $V_2$ are shown as being pentode valves with their suppressor grids connected to their cathode and their screening grids connected to the high tension positive supply.

Figure 4:
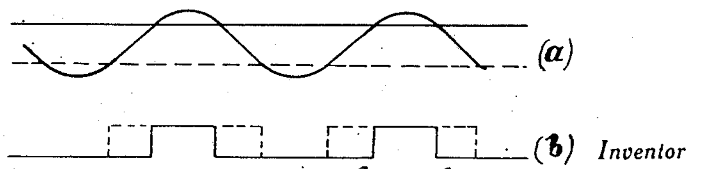
Fig. 4 is a diagram showing the waveform at the control grid of the valve $V_1$ and the anode of $V_2$ in Fig. 3.

As shown in Fig. 4*a*, the waveform applied to the control grid of the valve $V_1$ consists of the sine wave input supplied through the condenser $C_1$, combined with the adjustable bias obtained from the potentiometer $R_2$. The effect of varying the bias is to alter the angle of conductance of the valve $V_1$ so that when the bias is made more negative, the width of the squared waveform pulses in the input of the valve $V_2$ is reduced while, when the bias is made more positive, the width of the output pulses is increased. This is shown diagrammatically in Fig. 4*b*.

We claim:

1. Apparatus for generating a waveform comprising line and frame synchronising pulses, particularly for television transmitting systems, comprising means for producing a train of master pulses, means for deriving from said master pulses short duration pulses of opposite sign corresponding to the leading and trailing edges of said master pulses, a line pulse generator, means for triggering said line pulse generator from the short duration pulses of one sign, means for feeding the short duration pulses of opposite sign to a divider network, gating means controlled by the output from said divider network, a frame pulse generator, means for feeding short duration pulses of said first sign to said gating means, means for feeding the said short duration pulses passed by said gating means to trigger said frame pulse generator, and means for varying the time duration of the master pulses.

2. Apparatus for generating a waveform comprising line and frame synchronising pulses, particularly for television transmitting systems, comprising a master oscillator, means for producing from said master oscillator two trains of pulses of the same frequency, a line pulse generator, means for feeding the first of said trains of pulses to trigger said line pulse generator, a divider network, means for feeding the second train of pulses to said divider network, a gating means, means for feeding the output from said divider network to open said gating means for a minimum time period sufficient to include the instant at which the next following pulse of said first train occurs, a frame pulse generator, means for feeding said first train of pulses to the gating means, means for feeding the pulses which are passed by the gating means when the gating means is open to trigger the frame pulse generator, and means for varying the time relationship between the pulses of the two trains.

3. Apparatus for generating a waveform comprising line and frame synchronising pulses particularly for television transmitting systems comprising a master oscillator, means for producing from said master oscillator two trains of pulses of the same frequency but of opposite sign, a line pulse generator, means for feeding the first train of pulses of one sign to trigger said line pulse generator, a divider network, means for feeding the second train of pulses of opposite sign to said divider network, a gating means, means for feeding the outut from said divider network to open said gating means for a minimum time period sufficient to include the instant at which the next following pulse of said first train occurs, a frame pulse generator, means for feeding said first train of pulses, the gating means, means for feeding the pulses which are passed by the gating means when the gating means is open to trigger the frame pulse generator, and means for varying the time relationship between the pulses of the two trains.

4. Apparatus for generating a waveform comprising line and frame synchronising pulses, particularly for television transmitting systems, comprising means for producing a first train of pulses, means for producing a second train of pulses at the same repetition frequency as said first train of pulses, but of opposite sign, a line pulse generator, means for triggering said line pulse generator from said first train of pulses, a divider network, means for feeding said second train of pulses to said divider network, a gating means opened by the output of said divider network for a minimum time period sufficient to include the instant at which the next following pulse of said first train occurs, means for feeding said first train of pulses to said gating means, a frame pulse generator, means for feeding the pulses from the first train which are passed by said gating means when the gating means is open to trigger said frame pulse generator, and means for varying the time relationship between said first and second trains of pulses.

5. Apparatus for generating a waveform comprising line and frame synchronising pulses, particularly for television transmitting systems, comprising means for producing a first train of pulses, means for producing a second train of pulses at the same repetition frequency as said first train of pulses, a line pulse generator, means for triggering said line pulse generator from said first train of pulses, a divider network, means for feeding said second train of pulses to said divider network, a gating means opened by the output of said divider network for a minimum time period sufficient to include the instant at which the next following pulse of said first train occurs, means for feeding said first train of pulses to said gating means, a frame pulse generator, means for feeding the pulses from the first train which are passed by said gating means when the gating means is open to trigger said frame pulse generator, and means for varying the time relationship between said first and second trains of pulses.

6. A waveform generator for generating waveforms comprising line and frame synchronising pulses as used in television transmitting systems, comprising a master pulse generator, a waveform shaping circuit fed from the said master pulse generator, means for deriving pulses of opposite sign from said waveform shaping circuit, a line pulse generator and a frame pulse generator, means for feeding the line pulse generator with pulses of the one sign derived from the waveform shaping circuit, a divider network, means for feeding the divider network with pulses of the other sign derived from the waveform shaping circuit, a gating means, controlled by the output from the divider network and controlling the admission of said pulses of the one sign to the frame pulse generator and means for varying the time relationship between the pulses of opposite sign.

7. A waveform generator for generating waveforms comprising line and frame synchronising pulses as used in television transmitting systems, comprising a master oscillator, a waveform shaping circuit comprising two electronic valves, each having an anode, a cathode and at least one grid electrode, a source of bias, means for applying the bias to the grid of the first valve, means for applying the output of the master oscillator to the grid of the first valve, a direct current connection between the grid of the second valve and the anode of the first valve, means connecting the cathode of the first valve directly to the cathode of the second valve, a resistor connected between said cathodes and a point of substantially fixed potential, a source of high tension, means connecting each of said anodes to the positive pole of said high tension source, means for deriving two trains of pulses respectively of opposite sign from said waveform shaping circuit, a line pulse generator and a frame pulse generator, means for feeding the line pulse generator with pulses of the one sign derived from the waveform shaping circuit, a divider network, means for feeding the divider network with pulses of the other sign derived from the waveform shaping circuit, a gating circuit, controlled by the output from the divider network and controlling the admission of said pulses of the one sign to the frame pulse generator and means for varying said bias applied to the grid of first valve to vary the time relationship between the two trains of pulses of opposite sign.

8. A waveform generator for generating waveforms comprising line and frame synchronising pulses as used in television transmitting systems, comprising a master oscillator, a waveform shaping circuit comprising two electronic valves each having an anode, a cathode and at least one grid electrode, a high tension supply having positive and negative poles for supplying said valves, a potentiometer connected across the positive and negative poles of said high tension supply, means connecting the movable contact of the potentiometer to the grid of the first valve, means for applying the output of the master oscillator to the grid of the first valve, a resistor connected directly between the grid of the second valve and the anode of the first valve, a lead connecting the cathode of the first valve directly to the cathode of the second valve, a resistor connected between said cathodes and a point of substantially fixed potential, a load resistor in series between each of said anodes and the positive pole of said high tension supply, means for deriving two trains of pulses respectively of opposite sign from said waveform shaping circuit, a line pulse generator and a frame pulse generator, means for feeding the line pulse generator with pulses of the one sign derived from the waveform shaping circuit, a divider network, means for feeding the divider network with pulses of the other sign derived from the waveform shaping circuit, a gating circuit, controlled by the output from the divider network and controlling the admission of said pulses of the one sign to the frame pulse generator and means for adjusting the movable contact of said potentiometer for varying the time relationship between the two trains of pulses of opposite sign.

References Cited in the file of this patent

UNITED STATES PATENTS

| Number | Name | Date |
|---|---|---|
| 2,145,332 | Bedford | Jan. 31, 1939 |
| 2,207,048 | Campbell | July 9, 1940 |
| 2,258,943 | Bedford | Oct. 14, 1941 |
| 2,277,000 | Bingley | Mar. 17, 1942 |
| 2,350,536 | Schlesinger | June 6, 1944 |
| 2,425,600 | Coykendall | Aug. 12, 1947 |
| 2,464,594 | Mahoney | Mar. 15, 1949 |
| 2,466,044 | Schoenfeld | Apr. 5, 1949 |
| 2,480,582 | Houghton | Aug. 30, 1949 |
| 2,486,391 | Cunningham | Nov. 1, 1949 |
| 2,614,222 | Skellett | Oct. 14, 1952 |

FOREIGN PATENTS

| Number | Country | Date |
|---|---|---|
| 552,301 | Great Britain | Mar. 31, 1943 |